US011641111B2

(12) United States Patent
Wu

(10) Patent No.: US 11,641,111 B2
(45) Date of Patent: May 2, 2023

(54) ENERGY DISPATCH SYSTEM, APPARATUS, AND METHOD

(71) Applicant: Institute For Information Industry, Taipei (TW)

(72) Inventor: Jui-Ming Wu, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 246 days.

(21) Appl. No.: 17/155,027

(22) Filed: Jan. 21, 2021

(65) Prior Publication Data

US 2022/0102977 A1 Mar. 31, 2022

(30) Foreign Application Priority Data

Sep. 30, 2020 (TW) .................................. 109134235

(51) Int. Cl.
*H02J 3/32* (2006.01)
*H04L 67/12* (2022.01)
(Continued)

(52) U.S. Cl.
CPC .............. *H02J 3/32* (2013.01); *G05B 13/026* (2013.01); *H02J 3/003* (2020.01);
(Continued)

(58) Field of Classification Search
CPC .............. G05B 13/026; H02J 13/00006; H02J 3/003; H02J 3/32; H02J 7/00032; H02J 7/0013;
(Continued)

(56) References Cited

U.S. PATENT DOCUMENTS 9,031,824 B2   5/2015 Nasle
10,510,029 B2  12/2019 Sun et al.
(Continued)

FOREIGN PATENT DOCUMENTS

CN   105427063 A   3/2016
CN   110535119 A   12/2019
(Continued)

OTHER PUBLICATIONS

Office Action to the corresponding Taiwan Patent Application rendered by the Taiwan Intellectual Property Office (TIPO) dated Apr. 9, 2021, 7 pages (including English translation).

*Primary Examiner* — Kidest Bahta
(74) *Attorney, Agent, or Firm* — Maschoff Brennan

(57) ABSTRACT

An energy dispatch system, apparatus, and method are disclosed. The energy dispatch system includes a server and multiple site controllers respectively corresponding to multiple users. Each user corresponds to an energy storage device, and each energy storage device has a stage of charge. The server determines a scheduled power consumption target of each scheduling period for each user according to a total support power, multiple power consumption references of the users, and the stages of charge. The server transmits each scheduled power consumption target corresponding to a first scheduling period of the scheduling periods to the corresponding site controller. Each site controller controls the corresponding energy storage device to charge or discharge according to the corresponding actual load and the corresponding state of charge in the first scheduling period so that the power consumption of the corresponding user during the first scheduling period meets the corresponding scheduled power consumption target.

18 Claims, 9 Drawing Sheets

(51) Int. Cl.
*G05B 13/02* (2006.01)
*H02J 13/00* (2006.01)
*H02J 3/00* (2006.01)
*H02J 7/00* (2006.01)

(52) U.S. Cl.
CPC .... *H02J 7/00032* (2020.01); *H02J 13/00006* (2020.01); *H04L 67/12* (2013.01)

(58) Field of Classification Search
CPC ..... H02J 7/0068; H02J 7/00712; H04L 67/12; Y02E 60/00; Y04S 10/14; Y04S 10/50; Y04S 40/18
See application file for complete search history.

(56) References Cited

U.S. PATENT DOCUMENTS

| | | | | |
|---|---|---|---|---|
| 2012/0074909 | A1* | 3/2012 | Hondo | H02J 3/32 |
| | | | | 320/128 |
| 2015/0142179 | A1* | 5/2015 | Ito | F24F 11/46 |
| | | | | 700/276 |
| 2015/0326015 | A1* | 11/2015 | Steven | G06F 17/10 |
| | | | | 700/291 |

FOREIGN PATENT DOCUMENTS

| | | |
|---|---|---|
| TW | 201638862 A | 11/2016 |
| TW | 202030688 A | 8/2020 |

* cited by examiner

ENERGY DISPATCH SYSTEM, APPARATUS, AND METHOD

PRIORITY

This application claims priority to Taiwan Patent Application No. 109134235 filed on Sep. 30, 2020, which is hereby incorporated by reference in its entirety.

FIELD

The present invention relates to an energy dispatch system, apparatus, and method. Specifically, the present invention relates to an energy dispatch system, apparatus, and method for multi-site aggregation.

BACKGROUND

With the development of smart electricity grids, power users (i.e. power consumers) can use various self-built energy devices to manage energy and to participate in power market operation in terms of providing various grid services, such as demand response, load shifting, spinning reserve, supplemental reserve, and other auxiliary services. However, these grid services often have a participation threshold regarding the minimum support power, so small users are often unable to participate in alone because of insufficient device scale. Even if the device scale of a small user is large enough to participate in some grid service alone, it is often the case that the small user cannot achieve the service target when providing the grid service alone because the power load of the small user usually changes dynamically. Under these circumstances, a variety of aggregation dispatch technologies have been developed in the art, which participate in the power market operation in groups through a aggregator.

The existing aggregation dispatch technologies may be mainly divided into two categories. The first category of aggregation dispatch technologies adopts centralized computing architecture, which equips a cloud server to collect information of every client device at any time, calculate the total load of these client devices, and then flexibly dispatches each of the client devices according to the change of the aggregated total load. However, since the cloud server controls the client devices through the wide area network, it is difficult to achieve the real-time control and, hence, results in poor dispatch effect. In addition, if the network fails, the operation of the system will be interrupted. The second category of aggregation dispatch technologies adopts a distributed computing architecture, in which a cloud server distributes the total support power to each client device and then the site controller of each client device dispatches power according to the distributed support power. The second category of aggregation dispatch technologies can solve the problems of the first category of aggregation dispatch technologies (i.e., being difficult to achieve real-time control and the system being unable to function when the network fails). However, if the actual load is different from the predicted load in the process of dispatching power in real time, power users cannot support each other and thereby result in poor overall dispatch effect.

Accordingly, there is an urgent need in the art for an aggregation dispatch technology that enables power consumers to support each other in the process of dispatching power in real time so as to improve the overall service performance of the group of consumers and even reduce the charging and discharging costs.

SUMMARY

An objective of certain embodiments of the present invention is to provide an energy dispatch apparatus. The energy dispatch apparatus in certain examples may comprise a storage, a communication interface, and a processor, wherein the processor is electrically connected to the storage and the communication interface. The storage stores a power consumption reference of each of a plurality of users, wherein each of the users corresponds to a site controller, and each of the users corresponds to an energy storage device. The communication interface receives a state of charge of each of the energy storage devices at a time point from the corresponding site controller. The processor determine a scheduled power consumption target of each of a plurality of scheduling periods for each of the users according to a total support power, the power consumption references, and the stages of charge. The communication interface transmits each of the scheduled power consumption targets corresponding to a first scheduling period of the scheduling periods to the corresponding site controller. Each of the site controllers controls the corresponding energy storage device to perform energy adjustment according to a corresponding actual power consumption load and the corresponding stage of charge during the first scheduling period so that a power consumption of the corresponding user during the first scheduling period meets the corresponding scheduled power consumption target.

An objective of certain embodiments of the present invention is to provide an energy dispatch system. The energy dispatch system in certain examples may comprise a server and a plurality of site controllers. The site controllers correspond to a plurality of users one to one, wherein each of the users corresponds to an energy storage device. The server stores a power consumption reference of each of the users and receives a state of charge of each of the energy storage devices at a time point from the corresponding site controllers. The server determines a scheduled power consumption target of each of a plurality of scheduling periods for each of the users according to a total support power, the power consumption references, and the stages of charge, and the server transmits each of the scheduled power consumption targets corresponding to a first scheduling period of the scheduling periods to the corresponding site controller. Each of the site controllers receives the corresponding scheduled power consumption target and controls the corresponding energy storage device to perform energy adjustment according to a corresponding actual power consumption load and the corresponding stage of charge during the first scheduling period so that a power consumption of the corresponding user during the first scheduling period meets the corresponding scheduled power consumption target.

An objective of certain embodiments of the present invention is to provide an energy dispatch method which is for use in an energy dispatch system. The energy dispatch system in certain example may comprise a sever and a plurality of site controllers. The site controllers correspond to a plurality of users one to one, and each of the users corresponds to an energy storage device. The sever stores a power consumption reference of each of the users. The energy dispatch method comprises following steps: (a) receiving, by the server, a stage of charge of each of the energy storage devices at a time point from the corresponding site controller, (b) determining, by the server, a scheduled power consumption target of each of a plurality of scheduling periods for each of the users according to a total support power, the power consumption references, and the stages of charge, (c) transmitting, by the server, each of the scheduled power consumption targets corresponding to a first scheduling period of the scheduling periods to the corresponding site controller, (d) receiving, by each of the site controllers, the corresponding scheduled power consumption target, and (e) controlling, by each of the site controllers, the corresponding energy storage device to perform energy adjustment according to a corresponding actual power consumption load and the corresponding stage of charge during the first scheduling period so that a power consumption of the corresponding user during the first scheduling period meets the corresponding scheduled power consumption target.

When a plurality of users participate in a grid service of a power company together during a service demand period, the energy dispatch technology (including at least the system, apparatus, and method) can aggregately dispatch the energy storage of these users. Specifically, according to the energy dispatch technology in certain examples, a server divides the service demand period into a plurality of scheduling periods and determines a scheduled power consumption target for each of the scheduling periods for each of the users according to a total support power required by the power company during the service demand period, a power consumption reference of each of the users, and a stage of charge of an energy storage device of each of the users. Each of the users corresponds to a site controller, and each of the site controllers controls the corresponding energy storage device to perform energy adjustment according to a corresponding actual power consumption load and the corresponding stage of charge during each scheduling period so that a power consumption of the corresponding user during each scheduling period meets the corresponding scheduled power consumption target. To optimize the energy dispatch, the energy dispatch technology provided by the present invention may redetermine a scheduled power consumption target for each of the users in each subsequent scheduling period after the end of each scheduling period.

Because the server determines a scheduled power consumption target for each user in each scheduling period by considering the power consumption references of all users and the stages of charge of all the energy storage devices, the users can support each other in each scheduling period and thereby improve the achievement rate that the users as a whole complete the grid service. In addition, even if the network between the server and the site controller fails temporarily, each site controller can operate independently without being interrupted and thereby improve the probability that each user reaches the corresponding scheduled power consumption target.

The detailed technology and preferred embodiments implemented for the subject invention are described in the following paragraphs accompanying the appended drawings for a person having ordinary skill in the art to well appreciate the features of the claimed invention.

DETAILED DESCRIPTION

In the following description, the energy dispatch system, apparatus, and method provided in certain example examples of the present invention will be explained with reference to example embodiments thereof. However, these example embodiments are not intended to limit the present invention to any specific environment, applications, or implementations described in these example embodiments. Therefore, description of these example embodiments is only for purpose of illustration rather than to limit the scope of the present invention.

It should be appreciated that, in the following embodiments and the attached drawings, elements unrelated to the present invention are omitted from depiction. In addition, the dimension of each element and dimensional scales among the elements in the attached drawings are provided only for ease of depiction and illustration, but not to limit the scope of the present invention.

Figure 1A:
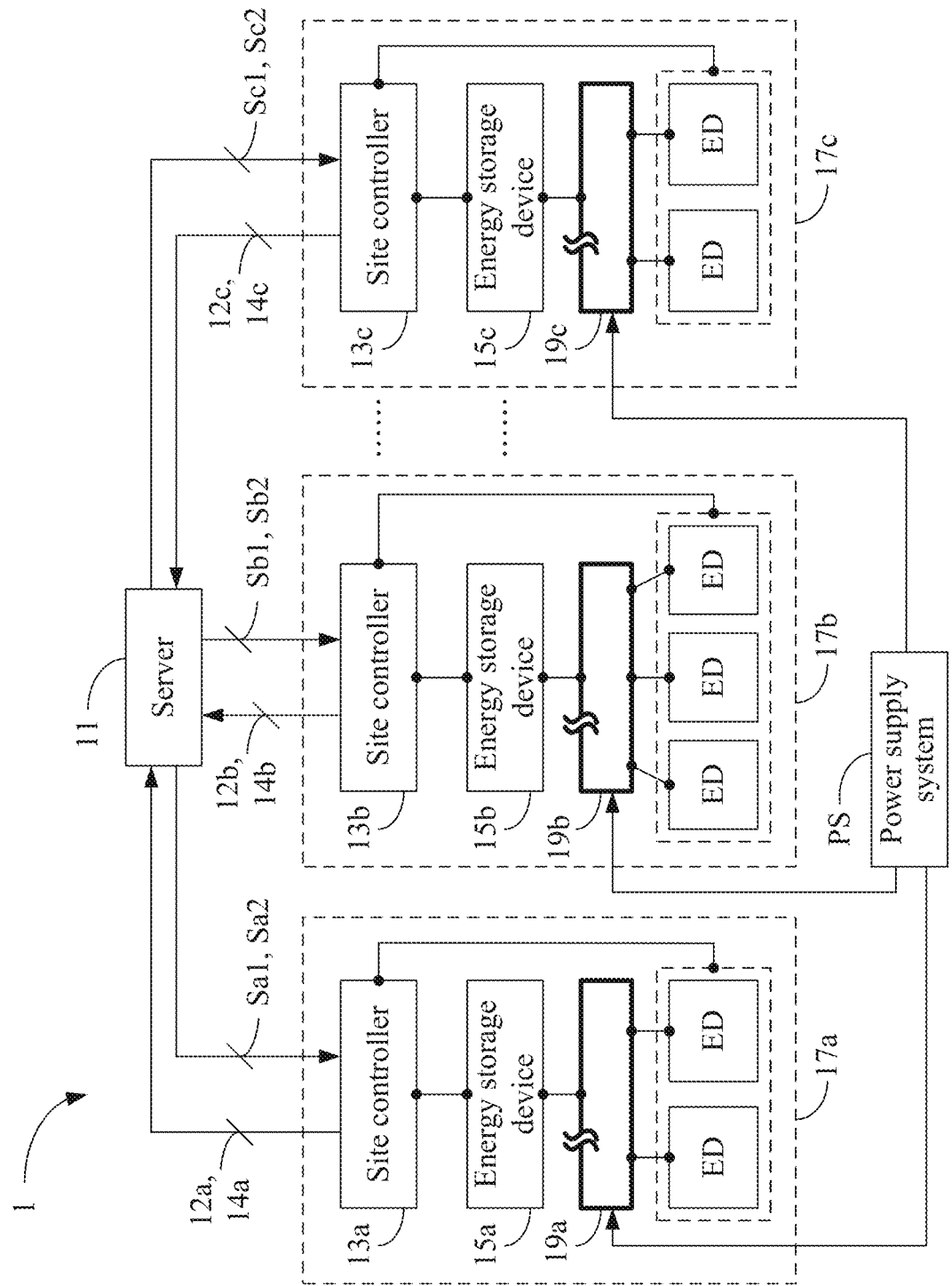
FIG. 1A depicts a schematic view of the architecture of the energy dispatch system 1 in some embodiments of the present invention.

A first embodiment of the present invention is an energy dispatch system 1, and a schematic view of which is depicted in FIG. 1A. The energy dispatch system 1 comprises a server (which may also be referred to as an "energy dispatch apparatus") 11 and a plurality of site controllers 13a, 13b, . . . , 13c. A plurality of users 17a, 17b, . . . , 17c correspond to the site controllers 13a, 13b, . . . , 13c one to one, the users 17a, 17b, . . . , 17c correspond to energy storage devices 15a, 15b, . . . , 15c one to one, and the users 17a, 17b, . . . , 17c correspond to the power circuits 19a, 19b, . . . , 19c one to one. In addition, the power circuits 19a, 19b, . . . , 19c are connected to the energy storage devices 15a, 15b, . . . , 15c one to one, all of the power circuits 19a, 19b, . . . , 19c are connected to a power supply system PS of a power company, and each of the power circuits 19a, 19b, . . . , 19c may be connected to one or more electrical devices ED. It shall be noted that the number of electrical devices ED connected to any power circuit is not limited in the present invention. At different time points, the number of electrical devices ED connected to a power circuit may be different. In addition, no matter how many electrical devices ED are connected to a power circuit, the corresponding site controller can obtain the actual total power consumption of all electrical devices ED on the power circuit in real time (for example, the power circuit may comprise several power sub-circuits, and the site controller is connected to these power sub-circuits. Therefore, when one or more power sub-circuits are connected to electrical devices ED, the site controller can obtain the actual power consumption of the electrical devices ED on each power sub-circuit and then calculate the actual total power consumption of all the electrical devices ED on the power circuit).

Based on the aforementioned connections and correspondences, a user may be regarded as a user field or a power consumption field. The power supply system PS and the energy storage devices 15a, 15b, . . . , 15c may provide power to the connected power circuits. In addition, the site controller corresponding to a user may control the energy storage device corresponding to the user to perform energy adjustment (e.g., charging and discharging). Taking the user 17a as an example, the site controller 13a may control the energy storage device 15a to perform energy adjustment. A user's power consumption to the power supply system PS of the power company is equal to the power consumption of the electrical device(s) ED connected to the power circuit of the user plus the charging amount of the energy storage device corresponding to the user or is equal to the power consumption of the electrical device(s) ED connected to the power circuit of the user minus the discharging amount of the energy storage device corresponding to the user. Therefore, if the site controller corresponding to a user controls the energy storage device corresponding to the user to discharge, the user's power consumption to the power supply system PS of the power company will decrease. If the site controller corresponding to a user controls the energy storage device corresponding to the user to charge, the user's power consumption for the power company will increase.

Figure 1B:
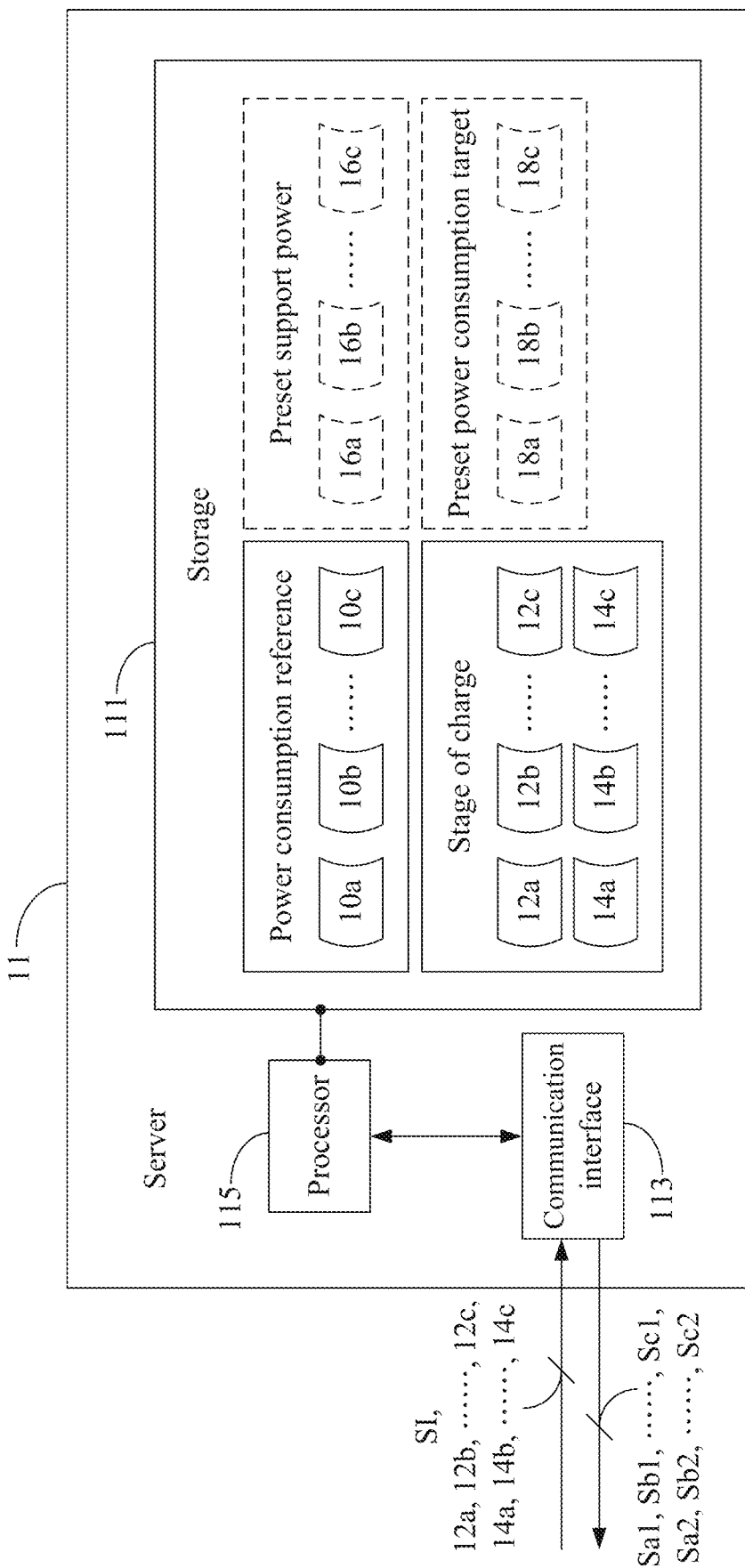
FIG. 1B depicts a schematic view of the architecture of the server 11 in some embodiments of the present invention.

Please refer to FIG. 1B, which depicts a schematic view of the architecture of the server 11. The server 11 comprises a storage 111, a communication interface 113, and a processor 115, and the processor 115 is electrically connected to the storage 111 and the communication interface 113. The storage 111 may be a Hard Disk Drive (HDD), a flash drive, a memory, or any other non-transitory storage medium or apparatus capable of storing digital information well-known to a person having ordinary skill in the art. The communication interface 113 may be any wired or wireless interface that may be used with the processor 115 and may receive and transmit signals, such as a network interface (but it is not limited thereto). The processor 115 may be one of various processors, Central Processing Units (CPU), Microprocessor Units (MPU), digital signal processors (DSP), or any other computing apparatus with the same function and well-known to a person having ordinary skill in the art.

In this embodiment, the users 17a, 17b, . . . , 17c participate in a grid service (e.g., demand response, load shifting, spinning reserve, and supplemental reserve) of a power company together. Please refer to FIG. 1C, which is a schematic view depicting a specific example of a grid service required by a power company. The server 11 receives a notice from the power company, which requests the users 17a, 17b, . . . , 17c as a whole to provide a total support power SA during a service demand period T. For example, the communication interface 113 or another communication interface of the server 11 may receive a scheduling command SI from the power company, and the scheduling command SI carries the service demand period T and the total support power SA. It shall be noted that the total support power SA required by the power company during the service demand period T is not limited by the present invention.

Figure 1C:
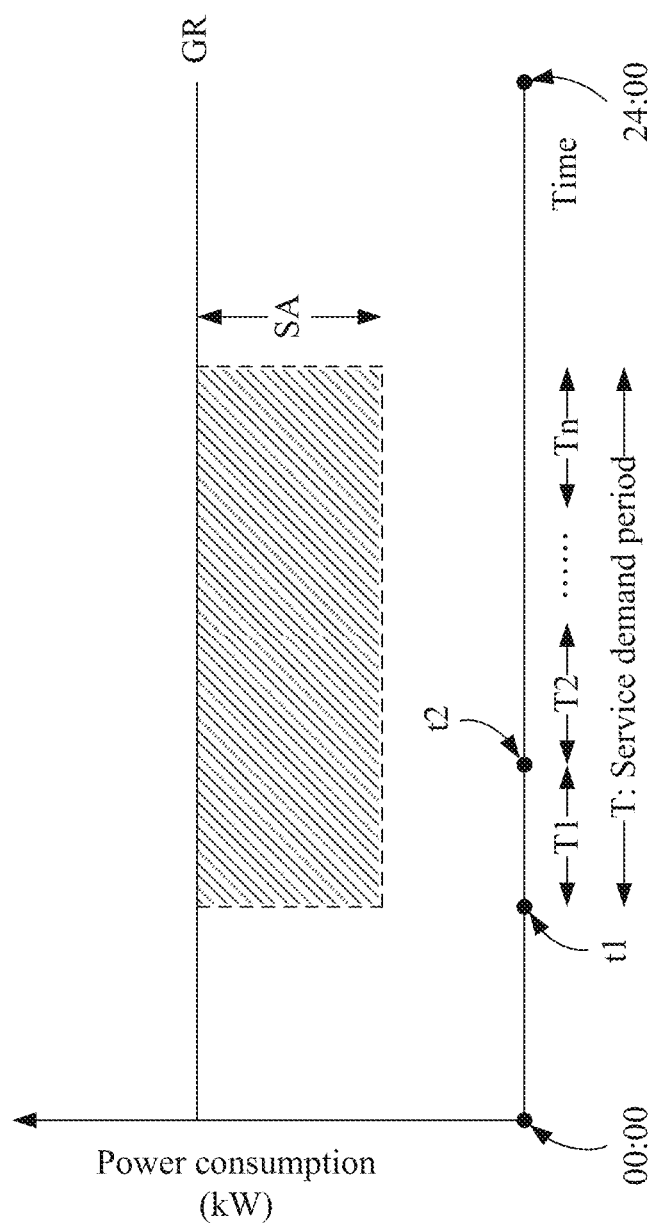
FIG. 1C is a schematic view depicting a specific example of a grid service required by a power company.

For example, the total support power SA may be the amount that the power company requires the users 17a, 17b, . . . , 17c as a whole to reduce from the total power consumption reference GR (Please note that the total power consumption reference GR is the sum of power consumption references of the users) during the service demand period T as shown in FIG. 1C. For another example, the total support power SA may be the amount that the power company requires the users 17a, 17b, . . . , 17c as a whole to increase from the total power consumption reference GR during the service demand period T. In this embodiment, the server 11 will aggregately dispatch energy of multiple user fields during the service demand period T (that is, aggregately dispatch the energy storage devices 15a, 15b, . . . , 15c of the users 17a, 17b, . . . , 17c to make the energy storage devices 15a, 15b, . . . , 15c perform energy adjustment) so that the users 17a, 17b, . . . , 17c as a whole may provide the total support power SA within the service demand period T.

The storage 111 of the server 11 stores the power consumption references 10a, 10b, . . . , 10c, wherein the power consumption references 10a, 10b, . . . , 10c correspond to the users 17a, 17b, . . . , 17c respectively. For example, the processor 115 of the server 11 may determine the power consumption references 10a, 10b, . . . , 10c of the users 17a, 17b, . . . , 17c respectively, wherein each of which is determined according to the past power consumption pattern of the corresponding user. For another example, after receiving the scheduling instruction SI, the server 11 may individually calculate an average demand for a past time period (for example, last 5 minutes) for each of the users 17a, 17b, . . . , 17c and take the average demand of a user as the power consumption reference of the user. As mentioned above, the sum of the power consumption references 10a, 10b, . . . , 10c is the total power consumption reference GR of the users 17a, 17b, . . . , 17c as a whole.

In this embodiment, the processor 115 of the server 11 divides the service demand period T into a plurality of scheduling periods T1, T2, . . . , Tn in sequence, wherein an end time point of each scheduling period is a start time point of the next scheduling period (if any). It shall be noted that the number of scheduling periods comprised in a service demand period T is not limited in the present invention. In addition, the present invention does not require that the lengths of these scheduling periods must be the same.

In this embodiment, before the start of each scheduling period, the server 11 determines a scheduled power consumption target of each pending scheduling period for each of the users 17a, 17b, . . . , 17c (which will be detailed later). Taking the scheduling period T1 as an example, before the start of the scheduling period T1, the server 11 determines the scheduled power consumption target of each of the scheduling periods T1, T2, . . . , Tn for each of the users 17a, 17b, . . . , 17c. Taking the scheduling period T2 as another example, before the start of the scheduling period T2, the server 11 determines the scheduled power consumption target of each of the scheduling periods T1, T2, . . . , Tn for each of the users 17a, 17b, . . . , 17c. It shall be noted that according to the present invention, it is not necessary that the server 11 has to determine the scheduled power consumption target of each scheduling period for each of the users 17a, 17b, . . . , 17c before the start of every scheduling period. For example, in some embodiments, the server 11 may determine the scheduled power consumption target of each of the scheduling periods T1, T2, . . . , Tn for each of the users 17a, 17b, . . . , 17c only before the start of the scheduling period T1. For another example, in some embodiments, the server 11 may determine the scheduled power consumption target of each pending scheduling period for each of the users 17a, 17b, . . . , 17c every several scheduling periods.

Now, an example regarding how the server 11, before the start of the scheduling period T1, determines the scheduled power consumption target of each pending scheduling period for each of the users 17a, 17b, . . . , 17c will be described in details.

The communication interface 113 of the server 11 receives the stages of charge 12a, 12b, . . . , 12c of the energy storage devices 15a, 15b, . . . , 15c at a time point t1 from the site controllers 13a, 13b, . . . , 13c respectively. It shall be noted that the time point t1 may be the starting time point of the scheduling period T1 or a time point extremely close to the starting time point of the scheduling period T1

(because the difference between the stages of charge of the energy storage device between two extremely close time points is within an allowable range). Please also note that the stage of charge of an energy storage device is the current stored power (kWh) of the energy storage device. In this embodiment, the stage of charge of an energy storage device is the percentage of the maximum energy storage capacity allowed by the energy storage device. In other embodiments, the stage of charge of an energy storage device may be the actual stored power of the energy storage device.

Next, the processor 115 of the server 11 determines the scheduled power consumption target of each of the scheduling periods T1, T2, ..., Tn for each of the users 17a, 17b, ..., 17c according to the total support power SA, the power consumption references 10a, 10b, ..., 10c (i.e., the power consumption references of the users), and the stages of charge 12a, 12b, ..., 12c (i.e., the stage of charges of the energy storage devices corresponding to the users). Taking the user 17a as an example, the processor 115 determines the scheduled power consumption target of each of the scheduling periods T1, T2, ..., Tn for the user 17a. The communication interface 113 of the server 11 at least transmits the scheduled power consumption target of the first scheduling period (i.e., the scheduling period T1) among the scheduling periods T1, T2, ..., Tn of each of the users to the corresponding site controller. Specifically, the processor 115 determines that the users 17a, 17b, ..., 17c respectively correspond to the scheduled power consumption targets Sa1, Sb1, ..., Sc1 during the scheduling period T1, so the communication interface 113 transmits the scheduled power consumption targets Sa1, Sb1, ..., Sc1 to the site controllers 13a, 13b, ..., 13c respectively.

The site controllers 13a, 13b, ..., 13c respectively receive the corresponding scheduled power consumption targets Sa1, Sb1, ..., Sc1. In addition, each of the site controllers 13a, 13b, ..., 13c controls the corresponding energy storage devices to perform energy adjustment (e.g., discharge and charge) according to a corresponding actual power consumption load (i.e., the actual power consumption load of the corresponding user) and the corresponding stage of charge (i.e., the stage of charge of the corresponding energy storage device at the time point t1) during the scheduling period T1 so that a power consumption of the corresponding user during the scheduling period T1 meets the corresponding scheduled power consumption target. Taking the site controller 13a as an example, the site controller 13a controls the energy storage device 15a to perform energy adjustment during the scheduling period T1 according to the actual power consumption load of the user 17a during the scheduling period T1 and the stage of charge 12a of the energy storage device 15a so that the power consumption of the user 17a during the scheduling period T1 meets the scheduled power consumption target Sa1. According to the foregoing description, a person having ordinary skill in the art shall appreciate that each of the site controllers 13b, ..., 13c will perform similar operations so that the power consumption of the corresponding user during the scheduling period T1 meets the corresponding scheduled power consumption target and, thus, the details will not be further described herein.

As mentioned above, before entering the scheduling period T1, the server 11 determines the scheduled power consumption target of each of the scheduling periods T1, T2, ..., Tn for each of the users 17a, 17b, ..., 17c. Therefore, in some embodiments, the communication interface 113 of the server 11 may also transmit the scheduled power consumption targets of each of the scheduling periods T2, ..., Tn (including the scheduled power consumption targets of the scheduling period T2 for the users 17a, 17b, ..., 17c, ..., and the scheduled power consumption targets of the scheduling period Tn for the users 17a, 17b, ..., 17c) to the corresponding site controllers. One of the advantages of this approach is that the server 11 does not have to decide the scheduled power consumption targets of each pending scheduling period for the users 17a, 17b, ..., 17c before entering every subsequent scheduling period, so the cost of calculation can be reduced under the condition that each site controller still know how to control the corresponding energy storage device to perform energy adjustment. Another advantage of this approach is that even if the communication between the server 11 and any site controller is interrupted, the site controller whose communication has been interrupted can still know how to control the corresponding energy storage device to perform energy adjustment.

As mentioned above, in this embodiment, the server 11 determines the scheduled power consumption target of each pending scheduling period for each of the users 17a, 17b, ..., 17c before the start of each scheduling period. Therefore, before entering the scheduling period T2 (for example, when the scheduling period T1 ends or is about to end), the communication interface 113 of the server 11 receives the stages of charge 14a, 14b, ..., 14c of the energy storage devices 15a, 15b, ..., 15c at a time point t2 from the site controllers 13a, 13b, ..., 13c respectively. It shall be noted that the time point t2 is later than the time point t1, and the time point t2 may be the starting time point of the scheduling period T2 or a time point very close to the starting time point of the scheduling period T2 (because the difference between the stages of charge of the energy storage device between two extremely close time points is within an allowable range).

The processor 115 of the server 11 then updates the scheduled power consumption target of each of the scheduling periods except the scheduling period T1 (i.e., each of the scheduling period T2, ..., Tn) for each of the users 17a, 17b, ..., 17c according to the total support power SA, the power consumption references 10a, 10b, ..., 10c, and the stages of charge 14a, 14b, ..., 14c.

The communication interface 113 of the server 11 at least transmits each of the scheduled power consumption targets corresponding to the scheduling period T2 to the corresponding site controller. Specifically, according to the decision made by the server 11 this time, the users 17a, 17b, ..., 17c correspond to the scheduled power consumption targets Sa2, Sb2, ..., Sc2 (which have been updated) respectively during the scheduling period T2, so the communication interface 113 transmits the scheduled power consumption targets Sa2, Sb2, ..., Sc2 to the site controllers 13a, 13b, 13c respectively. The site controllers 13a, 13b, ..., 13c receive the scheduled power consumption targets Sa2, Sb2, ..., Sc2 respectively. Each of the site controllers 13a, 13b, ..., 13c controls the corresponding energy storage device to perform energy adjustment (e.g., discharge and charge) according to a corresponding actual power consumption load (i.e., the actual power consumption load of the corresponding user at this time point) and the corresponding stage of charge (i.e., the stage of charge of the corresponding energy storage device at the time point t2) during the scheduling period T2 so that a power consumption of the corresponding user during the scheduling period T2 meets the corresponding scheduled power consumption target (which have been updated). Similarly, in some embodiments, the communication interface 113 of the server 11 may transmit the scheduled power consumption targets (which have been updated) corresponding to other scheduling periods to the corresponding site controllers, and this will not be further described.

In this embodiment, before entering other scheduling periods except the scheduling periods T1 and T2, the server 11 may perform similar operations to update the scheduled power consumption target of each of the pending scheduling periods for each of the users 17a, 17b, . . . , 17c. The specific operations performed by the server 11 shall be appreciated by a person having ordinary skill in the art based on the above description, and thus the details will not be further described herein.

It shall be noted that the server 11 redetermines the scheduled power consumption target of each of the pending scheduling periods for each of the users 17a, 17b, . . . , 17c before the start of each scheduling period, which has the advantage that the server 11 can determine how to dispatch the energy storage devices 15a, 15b, . . . , 15c according to the most instant stages of charge of the energy storage devices 15a, 15b, . . . , 15c and thereby improve the achievement rate that the users as a whole complete the grid service. Therefore, if the actual power consumption load of any user is significantly different from the power consumption reference referred to by the server 11 when calculating the scheduled power consumption target and results in the stage of charge of the corresponding energy storage device after the dispatch being different from the server's expectation (for example, the actual discharge amount or actual charge amount of the energy storage device during one or some scheduling periods is more or less than expected), the server 11 can still dispatch the energy storage devices 15a, 15b, . . . , 15c in an aggregated manner according to the most instant stages of charge. Therefore, when the overall stage of charge of the users 17a, 17b, . . . , 17c (i.e., the total stored power of the energy storage devices 15a, 15b, . . . , 15c together) may make the users 17a, 17b, . . . , 17c as a whole achieve the total support power SA during the subsequent periods, the server 11 may update the scheduled power consumption targets of the subsequent periods for the users 17a, 17b, . . . , 17c so that the users 17a, 17b, . . . , 17c as a whole achieve the total support power SA within the service demand period T.

A second embodiment of the present invention will now be described. The second embodiment is an extension of the first embodiment, so only the differences between the second embodiment and the first embodiment will be described in detail below. In this embodiment, the server 11 also determines a scheduled power consumption target of each pending scheduling period for each user before the start of each scheduling period. However, in this embodiment, the server 11 may execute a first round of scheduling and a second round of scheduling in the process of determining the scheduled power consumption target of each pending scheduling period for each user. In the first round of scheduling, the server 11 evaluates whether each user can achieve a preset power consumption target during each scheduling period and evaluates whether adopts the preset power consumption target as the scheduled power consumption target. In the second round of scheduling, the server 11 may consider the situations of all users (for example, with reference to the results of the first round of scheduling) to make the users support each other. In this way, the scheduled power consumption target of each pending scheduling period of one or some users may be adjusted.

In this embodiment, the processor 115 of the server 11 determines a preset power consumption target for each user before the start of the service demand period T. Specifically, the processor 115 of the server 11 may preset a scheduling ratio among the users 17a, 17b, . . . , 17c according to the maximum storage capacities allowed by the energy storage devices 15a, 15b, . . . , 15c. According to the scheduling ratio, the server 11 may divides the total support power SA into the preset support power 16a, 16b, . . . , 16c for the users 17a, 17b, . . . , 17c respectively. The sum of the preset support power 16a, 16b, . . . , 16c is the total support power SA. Then, for each user, the processor 115 of the server 11 calculates the preset power consumption target of the user according to the user's power consumption reference and the user's preset support power (for example, the value obtained by subtracting the preset support power of a user from the power consumption reference of the user is used as the preset power consumption target of the user). After the foregoing processing, the users 17a, 17b, . . . , 17c respectively correspond to the preset power consumption targets 18a, 18b, . . . , 18c.

Now, the operations relate to the first round of scheduling are elaborated in a specific example, which are executed before the start of the scheduling period T1. For each of the users, the processor 115 of the server 11 may determine, before the start of the scheduling period T1, a dispatch power of the user during each of the scheduling periods T1, T2, . . . , Tn according to a load prediction curve of the user, the preset power consumption target of the user, and the stage of charge of the user. It shall be noted that the load prediction curve of a user may be calculated by the server 11 (or other apparatuses, e.g., the server of the power company) according to the historical power consumption records of the user during the service demand period T in the past other days. It is noted that how to calculate the load prediction curve of a user is not the focus of the present invention, and thus will not be further described herein. For each user, by calculating the dispatch power of the user during each scheduling period before the start of the scheduling period T1, the processor 115 of the server 11 may decide whether to use the preset power consumption target of the user as the scheduled power consumption target of the user and may estimate whether the energy storage device of the user has a remaining power after the energy dispatch during the scheduling periods T1, T2, . . . , Tn.

Figure 2A:
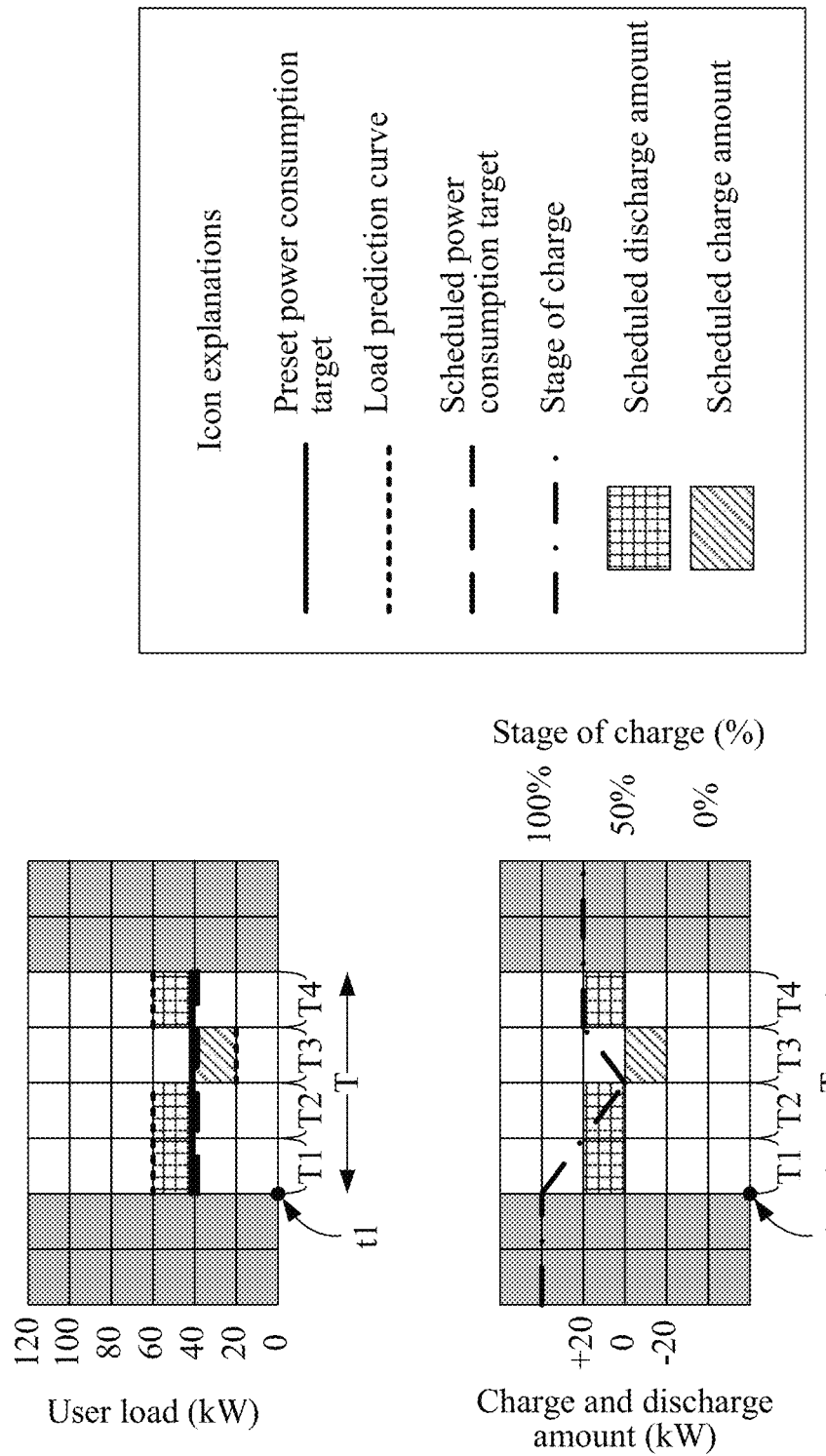
FIG. 2A is a schematic view depicting a specific example of a first round of scheduling.

Please refer to a specific example shown in FIG. 2A for comprehension, which, however, is not intended to limit the scope of the present invention. In this specific example, the processor 115 of the server 11 determines a dispatch power in each of the scheduling periods T1, T2, T3, and T4 for the user 17a according to a load prediction curve of the user 17a, the preset power consumption target 18a of the user 17a, and the stage of charge 12a of the energy storage device 15a of the user 17a, wherein each dispatch power may be a scheduled charge amount or a scheduled discharge amount. Specifically, in the first round of scheduling, the processor 115 of the server 11 knows that the stage of charge 12a of the energy storage device 15a is 100% and evaluates that the energy storage device 15a of the user 17a may achieve the preset power consumption target 18a by discharging 20 kW, discharging 20 kW, charging 20 kW, and discharging 20 kW during the scheduling periods T1, T2, T3, and T4 respectively. Therefore, in this specific example, the processor 115 of the server 11 may take the preset power consumption target 18a of the user 17a as the scheduled power consumption target of the user 17a during the scheduling periods T1, T2, T3, and T4. In addition, if the energy storage device 15a of the user 17a does discharge 20 kW, discharge 20 kW, charge 20 kW, and discharge 20 kW during the scheduling periods T1, T2, T3, and T4 respectively, the stage of charge of the energy storage device 15a will be 75% (i.e., it has remaining power) at the end time point of the scheduling period T4.

Figure 2B:
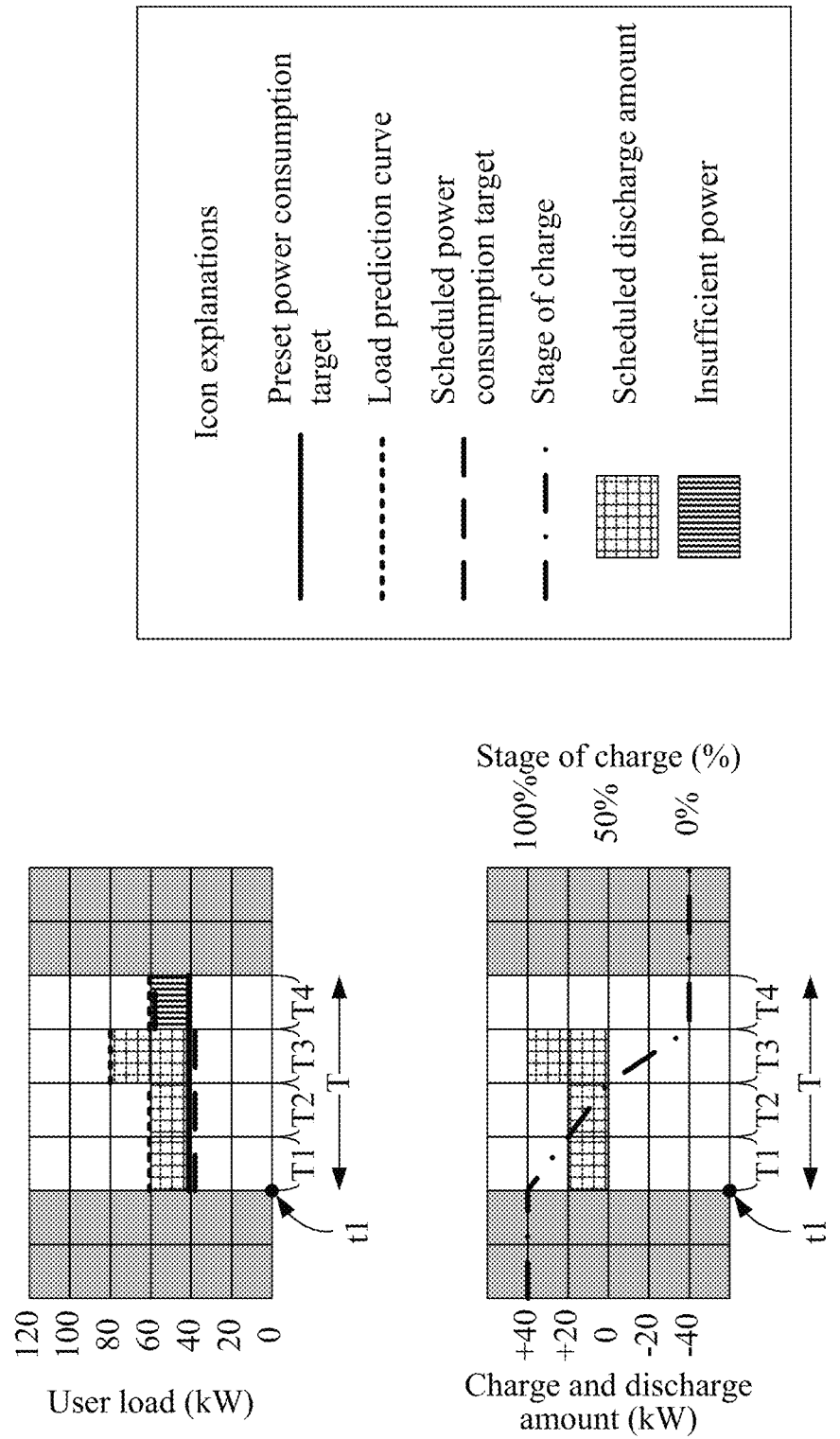
FIG. 2B is a schematic view depicting another specific example of a first round of scheduling.

Please refer to another specific example shown in FIG. 2B, which, however, is not intended to limit the scope of the present invention. In this specific example, the processor 115 of the server 11 determines a dispatch power of the user 17b in each of the scheduling periods T1, T2, T3, and T4 according to a load prediction curve of the user 17b, the preset power consumption target 18b of the user 17b, and the stage of charge 12b of the energy storage device 15b of the user 17b, wherein each dispatch power may be a scheduled charge amount or a scheduled discharge amount. Specifically, in the first round of scheduling, the processor 115 of the server 11 knows that the stage of charge 12b of the energy storage device 15b is 100% and evaluates that the energy storage device 15b of the user 17b may achieve the preset power consumption target 18b by discharging 20 kW, discharging 20 kW, and discharging 40 kW during the scheduling periods T1, T2, and T3 respectively. In addition, the processor 115 of the server 11 calculates that the stage of charge of the energy storage device 15b at the end time point of the scheduling period T3 is 0% and, thus, evaluates that the dispatch power of the energy storage device 15b during the scheduling period T4 can only be zero (i.e., it is not charged or discharged) and the preset power consumption target 18b cannot be achieved. Therefore, in this specific example, the processor 115 of the server 11 may take the preset power consumption target 18b of the user 17b as the scheduled power consumption target of the user 17b during the scheduling periods T1, T2, and T3. However, for the scheduling period T4, the processor 115 of the server 11 determines the scheduled power consumption target of the user 17b during the scheduling period T4 according to the preset power consumption target 18b and an insufficient power of the energy storage device 15b (for example, the value obtained by increasing the insufficient power of the preset power consumption target 18b is taken as the scheduled power consumption target). It shall be noted that the processor 115 of the server 11 only uses the preset power consumption target 18b as a reference to calculate the scheduled power consumption target of the user 17b during the scheduling period T4 and does not change the preset power consumption target 18b of the user 17b.

In some embodiments, after the first round of scheduling is finished, the server 11 may execute a second round of scheduling so that the users may support each other to increase the possibility that the users as a whole provide the total support power SA during the service demand period T. In these embodiments, the server 11 may adopt the first complementary support technology, the second complementary support technology, or both of the aforementioned complementary support technologies. It shall be noted that the second round of scheduling may be repeated for many times until there are no users can support other(s).

The first complementary support technology is described herein. If a certain user can achieve the preset power consumption target in all scheduling periods T1, T2, . . . , Tn according to the first round of scheduling and the energy storage device of which has a remaining power (that is, the server 11 determines that the energy storage device of the user has a remaining power according to the stage of charge of the user's energy storage device and the dispatch power of the user during the scheduling periods T1, T2, . . . , Tn), the user may serve as an rescue user. In addition, if a certain user fails to reach the preset power consumption target during one or some scheduling periods according to the first round of scheduling, the user may be considered as a to-be-rescued user. Depending on the situation, the server 11 may make one rescue user and one rescued user support each other complementarily, make one rescue user and multiple rescued users support each other complementarily, or make multiple rescue users and one rescued user support each other complementarily.

Figure 2C:
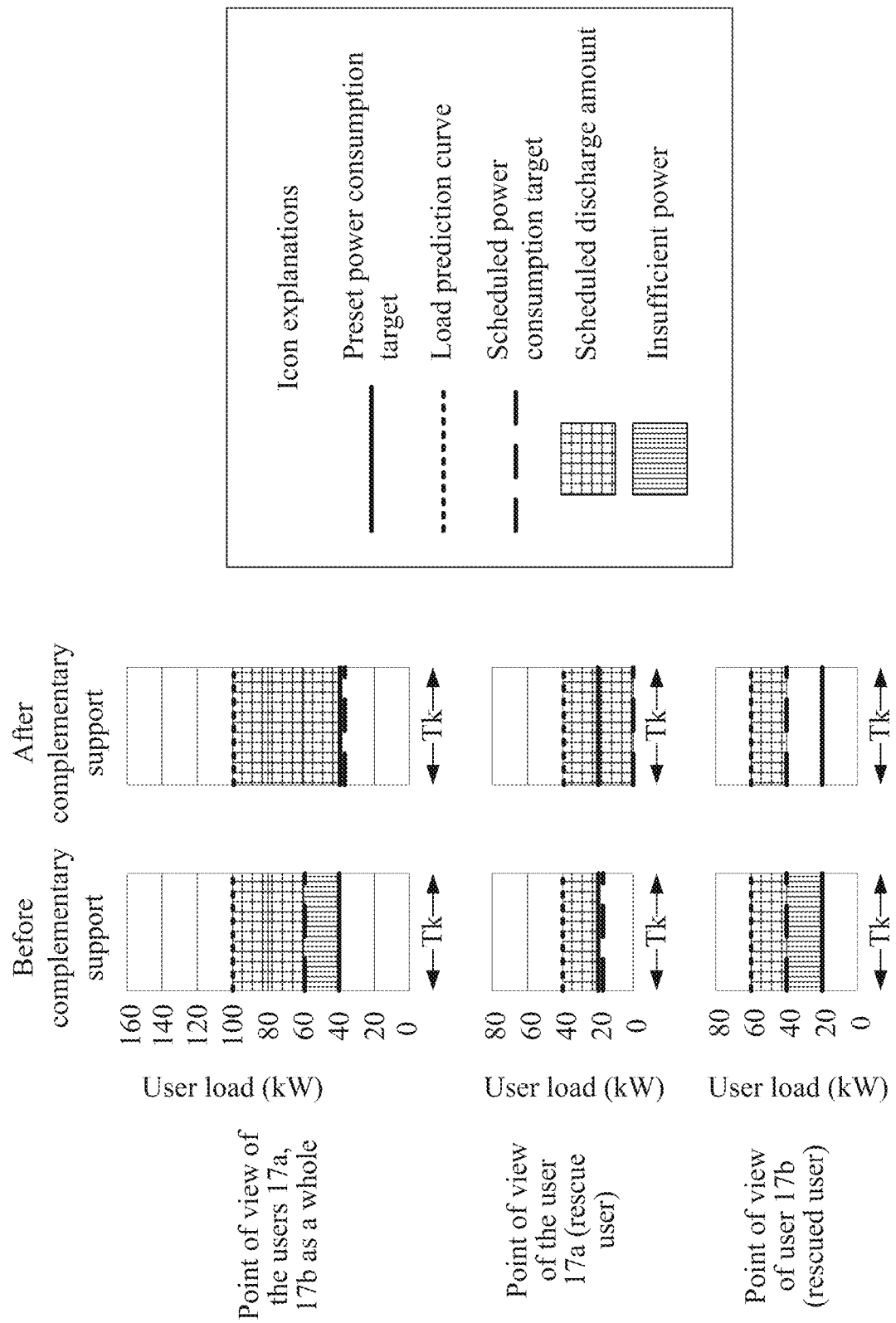
FIG. 2C is a schematic view depicting a specific example of the first complementary support technology.

Please refer to a specific example shown in FIG. 2C for comprehension, which, however, is not intended to limit the scope of the present invention. In this specific example, the server 11 makes one rescue user and one rescued user support each other complementarily. Specifically, the processor 115 of the server 11 determines that the energy storage device 15a of the user 17a has a remaining power according to the stage of charge 12a of the user 17a and the dispatch power of the user 17a during the scheduling periods T1, T2, . . . , Tn, so the user 17a may be used as a rescue user. In addition, according to the first round of scheduling, the user 17b cannot achieve the preset power consumption target 18b during the scheduling period Tk (which may be any of the scheduling periods T1, T2, . . . , Tn), so the user 17b may be used as a to-be-rescued user. The processor 115 of the server calculates an insufficient power of the energy storage device 15b of the user 17b during the scheduling period Tk according to the load prediction curve of the user 17b, the dispatch power of the user 17b during the scheduling period Tk, and the preset power consumption target 18b of the user 17b.

The processor 115 of the server 11 then determines the scheduled power consumption target of the users 17a during the scheduling period Tk and the scheduled power consumption target of the users 17b during the scheduling period Tk according to the preset power consumption target 18a of the users 17a, the preset power consumption target 18b of the users 17b, the remaining power of the energy storage device 15a of the users 17a, and the insufficient power of the energy storage device 15b of the users 17b during the scheduling period Tk. In the specific example of FIG. 2C, the remaining power of the energy storage device 15a is sufficient to support the insufficient power of the energy storage device 15b. Therefore, the processor 115 determines the scheduled power consumption target of the user 17a according to the insufficient power of the energy storage device 15b and the preset power consumption target 18a of the user 17a (for example, the value obtained by decreasing the preset power consumption target 18a of the user 17a by the insufficient power of the energy storage device 15b is taken as the scheduled power consumption target of the user 17a during the scheduling period Tk). It shall be noted that the processor 115 of the server 11 only uses the preset power consumption target 18a as a reference to calculate the scheduled power consumption target of the user 17a during the scheduling period Tk and does not change the preset power consumption target 18a of the user 17a. For the user 17b, the processor 115 determines the scheduled power consumption target of the user 17b during the scheduling period Tk according to the preset power consumption target 18b and the insufficient power of the energy storage device 15b (for example, the value obtained by increasing the preset power consumption target 18b of the user 17b by the insufficient power of the energy storage device 15b is taken as the scheduled power consumption target). Similarly, the processor 115 of the server 11 only uses the preset power consumption target 18b as a reference to calculate the scheduled power consumption target of the user 17b during the scheduling period Tk and does not change the preset power consumption target 18b of the user 17b.

As shown in FIG. 2C, if the first complementary support technology provided in the second round of scheduling is not adopted during the scheduling period Tk, the users 17a and 17b as a whole cannot achieve the overall preset power consumption target because the user 17b cannot achieve the corresponding preset power consumption target. On the contrary, if the first complementary support technology provided in the second round of scheduling is adopted during the scheduling period Tk, the users 17a and 17b as a whole can achieve the overall preset power consumption target since the server 11 will adjust the scheduled power consumption targets of both the users 17a and 17b. It means that the user 17a will support the user 17b.

As mentioned above, the server 11 may decide to make multiple rescue users and one rescued user support each other complementarily as appropriate. For example, the processor 115 of the server 11 determines that the energy storage device 15a of the user 17a has a remaining power according to the stage of charge 12a of the user 17a and the dispatch power of the user 17a during the scheduling periods T1, T2, . . . , Tn, so the user 17a may serve as a rescue user. In addition, the processor 115 of the server 11 further determines that the energy storage device 15c of the user 17c also has a remaining power according to the stage of charge 12c of the user 17c and the dispatch powers of the user 17c during the scheduling periods T1, T2, . . . , Tn, so the user 17c may also serve as a rescue user. In addition, according to the first round of scheduling, the user 17b cannot achieve the preset power consumption target 18b during the scheduling period Tk, so the user 17b may be used as a to-be-rescued user.

Similarly, the processor 115 of the server calculates an insufficient power of the energy storage device 15b of the user 17b in a certain scheduling period (for example, the scheduling period Tk shown in FIG. 2C) according to the load prediction curve of the user 17b, the dispatch power of the user 17b in the scheduling period, and the preset power consumption target of the user 17b. If the remaining power of the energy storage device 15a and the remaining power of the energy storage device 15c cannot independently support the insufficient power of the energy storage device 15b, the processor 115 of the server will make the energy storage device 15a and the energy storage device 15c support the energy storage device 15b together. Specifically, the processor 115 of the server 11 determines the scheduled power consumption target of the user 17a in the scheduling period Tk, the scheduled power consumption target of the user 17b in the scheduling period Tk, and the scheduled power consumption target of the user 17c in the scheduling period Tk according to the preset power consumption target of the user 17a, the preset power consumption target of the user 17b, the preset power consumption target of the user 17c, the remaining power of the user 17a, the remaining power of the user 17c, and the insufficient power of the user 17b. How the server 11 makes multiple rescue users and one rescued user support each other complementarily shall be appreciated by a person having ordinary skill in the art based on the related description of FIG. 2C, and thus will not be further described herein.

As mentioned above, the server 11 may decide to make one rescue user and multiple rescued users support each other complementarily as appropriate. For example, the processor 115 of the server 11 determines that the energy storage device 15a of the user 17a has a remaining power according to the stage of charge 12a of the energy storage device 15a of the user 17a and the dispatch power of the user 17a during the scheduling periods T1, T2, . . . , Tn, so the user 17a may serve as a rescue user. In addition, according to the first round of scheduling, the user 17b cannot achieve the preset power consumption target 18b during the scheduling period Tk, so the user 17b may be used as a to-be-rescued user. According to the first round of scheduling, the user 17c cannot achieve the preset power consumption target 18c during the scheduling period Tk, so the user 17c may also serve as a to-be-rescued user.

The processor 115 of the server 11 calculates an insufficient power of the user 17b during the scheduling period Tk according to the load prediction curve of the user 17b, the dispatch power of the user 17b during the scheduling period Tk, and the preset power consumption target 18b of the user 17b. In addition, the processor 115 of the server 11 calculates an insufficient power of the user 17c during the scheduling period Tk according to the load prediction curve of the user 17c, the dispatch power of the user 17c during the scheduling period Tk, and the preset power consumption target 18c of the user 17c. The processor 115 of the server 11 then determines the scheduled power consumption target of the user 17a during the scheduling period Tk, the scheduled power consumption target of the user 17b during the scheduling period Tk, and the scheduled power consumption target of the user 17c during the scheduling period Tk according to the preset power consumption target of the user 17a, the preset power consumption target of the user 17b, the preset power consumption target of the user 17c, the remaining power of the energy storage device 15a of the user 17a, the insufficient power of the energy storage device 15b of the user 17b, and the insufficient power of the energy storage device 15c of the user 17c. How the server 11 makes one rescue user and multiple rescued users support each other complementarily shall be appreciated by a person having ordinary skill in the art based on the related description of FIG. 2C, and thus will not be further described herein.

The second complementary support technology will be explained now. If the dispatch power of a user during a certain scheduling period is charging and the dispatch power of another user during the same scheduling period is discharging according to the first round of scheduling, the processor 115 of the server 11 will evaluate whether to make the two users support each other complementarily (that is, the dispatch power of the two users are cancelled by each other by a certain amount). Depending on the situations, the server 11 may perform complementary support for two or more users during the same scheduling period.

Figure 2D:
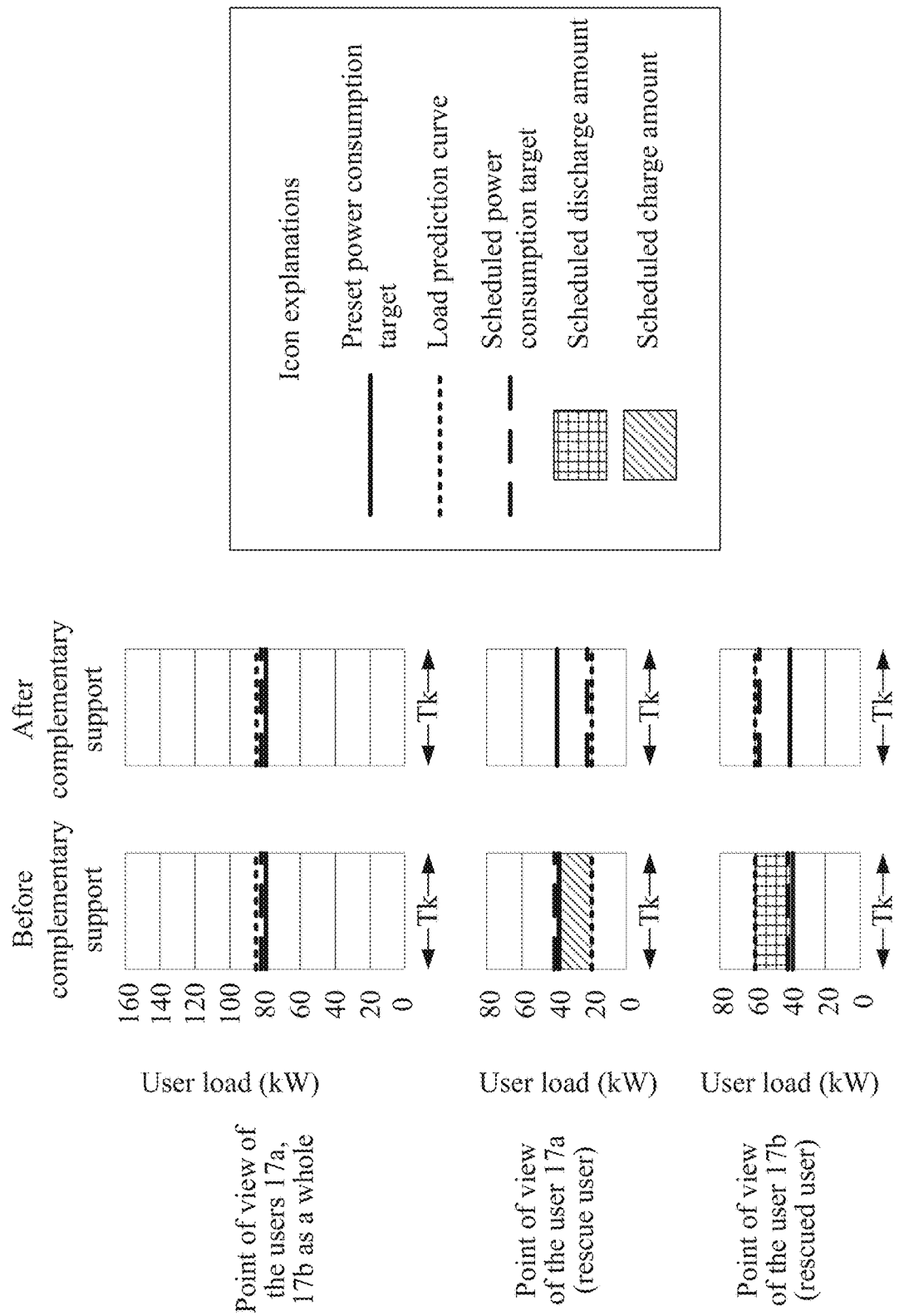
FIG. 2D is a schematic view depicting a specific example of the second complementary support technology.

Please refer to a specific example shown in FIG. 2D for comprehension, which, however, is not intended to limit the scope of the present invention. In this specific example, the server 11 makes two users support each other complementarily. The processor 115 of the server 11 determines that the dispatch power of the user 17a in the scheduling period Tk (which may be any one of the scheduling periods T1, T2, . . . , Tn) is charging, and the user 17a can achieve the preset power consumption target 18a. In addition, the processor 115 of the server 11 determines that the dispatch power of the user 17b in the same scheduling period Tk is discharging, and that the user 17b can achieve the preset power consumption target 18b. Since both the users 17a and 17b can achieve the corresponding preset power consumption targets 18a and 18b during the scheduling period Tk, it means that the users 17a and 17b can achieve the overall preset power consumption target as a whole.

Since the users 17a and 17b can achieve the overall preset power consumption target as a whole, and the dispatch power of the users 17a and 17b during the scheduling period Tk is charging and discharging respectively, the processor 115 of the server 11 makes the two users perform the second complementary support technology. The processor 115 of the server 11 determines the scheduled power consumption target of the user 17a during the scheduling period Tk and the scheduled power consumption target of the user 17b during the scheduling period Tk according to the preset power consumption target of the user 17a, the preset power consumption target of the user 17b, the dispatch power of the user 17a during the scheduling period Tk, the dispatch power of the user 17b during the scheduling period Tk, the stage of charge 12a of the energy storage device 15a corresponding to the user 17a, and the stage of charge 12b of the energy storage device 15b corresponding to the user 17b.

Specifically, the processor 115 of the server 11 evaluates whether cancelling the dispatch power of the energy storage device 15a during the scheduling period Tk with the dispatch power of the energy storage device 15b during the scheduling period Tk by a certain amount (i.e., reducing the dispatch power of the energy storage device 15a during the scheduling period Tk (i.e., the scheduled charge amount) and reducing the dispatch power of the energy storage device 15b during the scheduling period Tk (i.e., the scheduled discharge amount)) will make the energy storage device 15a as well as the energy storage device 15b unable to complete the scheduling of other scheduling periods. If it will not make the energy storage device 15a as well as the energy storage device 15b unable to complete the scheduling of other scheduling periods, the processor 115 makes the user 17a and the user 17b support each other complementarily during the scheduling period Tk (i.e., cancelling the dispatch power of the two users by each other by a certain amount, or even cancelling the dispatch power of the two users completely). As shown in FIG. 2D, the scheduled power (i.e., the scheduled discharge amount) of the energy storage device 15b of the user 17b during the scheduling period Tk happens to be the dispatch power (i.e., the scheduled charge amount) of the user 17a during the scheduling period Tk, but the dispatch power of the user 17b and the dispatch power of the user 17a are discharging and charging respectively. Therefore, the processor 115 of the server 11 determines the scheduled power consumption target of the user 17a during the scheduling period Tk according to the dispatch power of the user 17a during the scheduling period and the preset power consumption target 18a (for example, the value obtained by decreasing the preset power consumption target 18a by the dispatch power is taken as the scheduled power consumption target). For the user 17b, the processor 115 determines the scheduled power consumption target of the user 17b during the scheduling period Tk according to the dispatch power of the user 17b during the scheduling period Tk and the preset power consumption target 18b (for example, the value obtained by increasing the preset power consumption target 18b by the dispatch power is taken as the scheduled power consumption target). It shall be noted that the processor 115 of the server 11 will not change the preset power consumption target 18a of the user 17a and the preset power consumption target 18b of the user 17b.

As shown in FIG. 2D, even if the users 17a and 17b already can achieve the overall preset power consumption target as a whole during the scheduling period Tk, the dispatch power of the energy storage devices 15a and 15b can be reduced by the second complementary support technology. As the dispatch power and dispatch times of the energy storage devices 15a and 15b are reduced, the depreciation rate of products can be reduced and thereby prolong the service life of the energy storage devices 15a and 15b.

As mentioned above, the server 11 may also decide to make more users (for example, three) support each other complementarily as appropriate. For example, among the dispatch power of the user 17a during the scheduling period Tk, the dispatch power of the user 17b during the scheduling period Tk, and the dispatch power of the user 17c during the scheduling period Tk, the processor 115 of the server 11 determines that two of them are discharging and the remaining one is charging (or two of them are charging and one of them is discharging). The processor 115 of the server 11 then determines the scheduled power consumption target of the user 17a during the scheduling period Tk, the scheduled power consumption target of the user 17b during the scheduling period Tk, and the scheduled power consumption target of the user 17c during the scheduling period Tk according to the preset power consumption target of the user 17a, the preset power consumption target of the user 17b, the preset power consumption target of the user 17c, the dispatch power of the user 17a, the dispatch power of the user 17b, the dispatch power of the user 17c, the stage of charge 12a of the energy storage device 15a corresponding to the user 17a, the stage of charge 12b of the energy storage device 15b corresponding to the user 17b, and the stage of charge 12c of the energy storage device 15c corresponding to the user 17c. How the server 11 makes multiple users support each other complementarily shall be appreciated by a person having ordinary skill in the art based on the related description of FIG. 2D, and thus will not be further described herein.

In this embodiment, each time after the server 11 determines the scheduled power consumption target for each user in each pending scheduling period, the server 11 will at least transmit each scheduled power consumption target corresponding to the upcoming scheduling period to the corresponding site controller. The site controllers 13a, 13b, . . . , 13c individually receive the corresponding scheduled power consumption targets and control the corresponding energy storage device to perform energy adjustment (e.g., discharging and charging) according to a corresponding actual power consumption load and the corresponding stage of charge in the next scheduling period, so that a power consumption of the corresponding user in the scheduling period meets the corresponding scheduled power consumption target.

From the above description, when a plurality of users participate in a grid service of a power company together during a service demand period T, the energy dispatch system 1 can dispatch the energy storage of these users in an aggregated manner. The server 11 divides the service demand period T into a plurality of scheduling periods T1, T2, . . . , Tn and determines a scheduled power consumption target during each of the scheduling periods for each of the users according to the total support power SA required by the power company during the service demand period T, a power consumption reference of each of the users, and a stage of charge of an energy storage device of each of the users. Each of the users corresponds to a site controller, and each of the site controllers controls the corresponding energy storage device to perform energy adjustment according to a corresponding actual power consumption load and the corresponding stage of charge during each scheduling period so that a power consumption of the corresponding user during each scheduling period meets the corresponding scheduled power consumption target. To optimize the energy dispatch, the energy dispatch system 1 may further redetermine a scheduled power consumption target for each of the users in each subsequent scheduling period after the end of each scheduling period.

Because the server 11 determines a scheduled power consumption target for each user in each scheduling period by considering the power consumption references of all users and the stages of charge of all the energy storage devices of the users and enables the users to support each other in each scheduling period according to the first complementary support technology and/or the second complementary support technology, the achievement rate that the users as a whole complete the grid service can be improved. Even if the network between the server and the site controller fails temporarily, each site controller can operate independently without being interrupted and thereby improve the probability that each user reaches the corresponding scheduled power consumption target thereof.

Figure 3A:
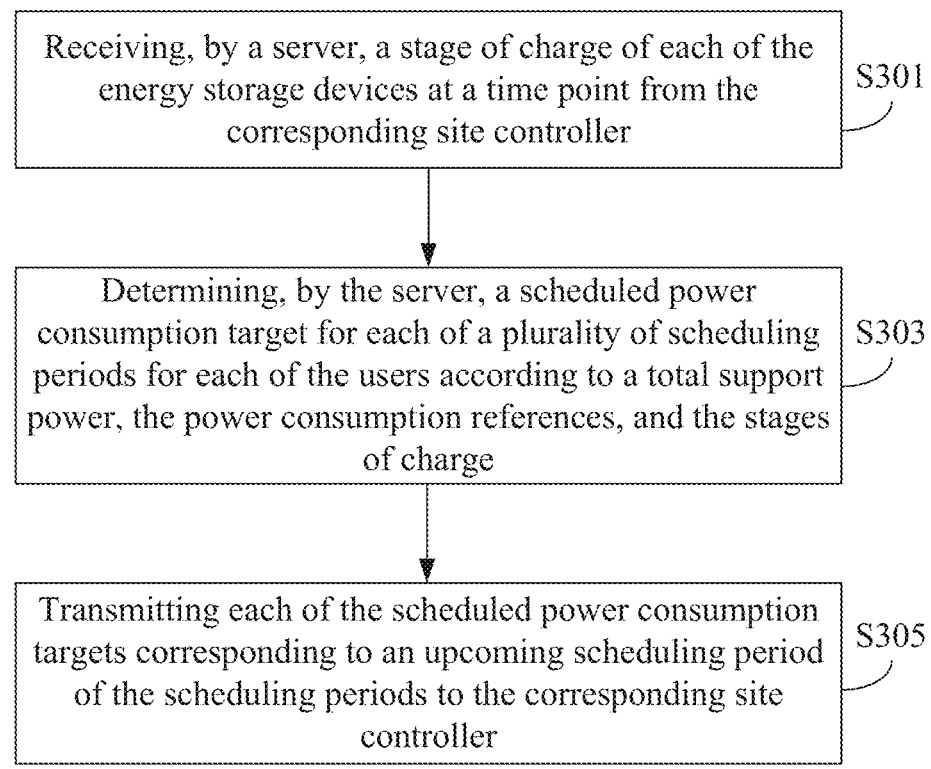
FIG. 3A and FIG. 3B are the main flowcharts of an energy dispatch method in some embodiments of the present invention.
Figure 3B:
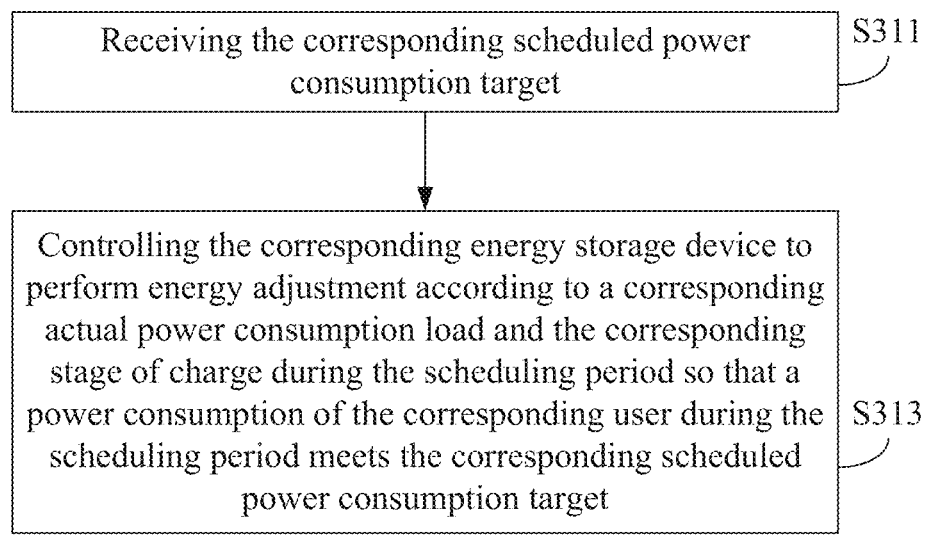

A third embodiment of the present invention is an energy dispatch method, and a main flowchart thereof is shown in FIG. 3A and FIG. 3B. The energy dispatch method is for use in an energy dispatch system (e.g., the aforesaid energy dispatch system 1). The energy dispatch system comprises a sever (e.g., the aforesaid server 11) and a plurality of site controllers (e.g., the aforesaid site controllers 13a, 13b, . . . , 13c). The process flow shown in FIG. 3A is executed by the server, while the process flow shown in FIG. 3B is executed by each of the site controllers. The site controllers correspond to a plurality of users one to one, and each of the users corresponds to an energy storage device.

Please refer to FIG. 3A. In step S301, the server receives a stage of charge of each of the energy storage devices at a time point from the corresponding site controller. In step S303, the server determines a scheduled power consumption target of each of a plurality of scheduling periods for each of the users according to a total support power, the power consumption references, and the stages of charge. In step S305, the server transmits each of the scheduled power consumption targets corresponding to an upcoming scheduling period of the scheduling periods to the corresponding site controller.

It shall be noted that, in some embodiments, when executing the step S303, the energy dispatch method may execute the first round of scheduling as described in the previous embodiments, or may even execute the second round of scheduling as described in the previous embodiments. In addition, in some embodiments, the energy dispatch method may execute the aforementioned first complementary support technology and/or the aforementioned second complementary support technology in the second round of scheduling. How the energy dispatch method performs the first round of scheduling, the second round of scheduling, the first complementary support technology, and the second complementary support technology shall be appreciated by a person having ordinary skill in the art according to the contents of the aforementioned embodiments, and thus will not be further described herein.

Referring to FIG. 3B, in step S311, a site controller receives the corresponding scheduled power consumption target. In step S313, the site controller controls the corresponding energy storage device to perform energy adjustment according to a corresponding actual power consumption load and the corresponding stage of charge during the scheduling period so that a power consumption of the corresponding user during the scheduling period meets the corresponding scheduled power consumption target. As described above, each of the site controllers in the energy dispatch system executes the process flow shown in FIG. 3B.

In addition to the aforesaid steps, the third embodiment can also execute all the operations and steps executed by the energy dispatch system 1 in the first and second embodiments, have the same functions and deliver the same technical effects as the energy dispatch system 1. How the third embodiment executes these operations and steps, has the same functions and delivers the same technical effects as the energy dispatch system 1 will be readily appreciated by a person having ordinary skill in the art based on the explanation of the energy dispatch system 1, and thus will not be further described herein.

It shall be noted that, in the specification and the claims of the present invention, some terms (including time point, stage of charge, scheduling period, dispatch power, user, remaining power, and insufficient power) are preceded by "first," "second," or "third," which are only used to distinguish these terms.

According to the above descriptions, when a plurality of users participate in a grid service of a power company together during a service demand period, the energy dispatch technology provided by the present invention (including at least the system, apparatus, and method) can dispatch the energy storage of these users in an aggregated manner. Specifically, the energy dispatch technology provided by the present invention divides the service demand period into a plurality of scheduling periods by a server, and the server determines a scheduled power consumption target for each of the scheduling periods for each of the users according to a total support power required by the power company during the service demand period, a power consumption reference of each of the users, and a stage of charge of an energy storage device of each of the users. Each of the users corresponds to a site controller, and each of the site controllers controls the corresponding energy storage device to perform energy adjustment according to a corresponding actual power consumption load and the corresponding stage of charge during each scheduling period so that a power consumption of the corresponding user during each scheduling period meets the corresponding scheduled power consumption target. To optimize the energy dispatch, the energy dispatch technology provided by the present invention may further redetermine a scheduled power consumption target for each of the users in each subsequent scheduling period after the end of each scheduling period.

Because the server determines a scheduled power consumption target for each user in each scheduling period by considering the power consumption references of all users and the stages of charge of all the energy storage devices of the users, the users can support each other in each scheduling period and thereby improve the achievement rate that the users as a whole complete the grid service. Even if the network between the server and the site controller fails temporarily, each site controller can operate independently without being interrupted and thereby improve the probability that each user reaches the corresponding scheduled power consumption target.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An energy dispatch apparatus, comprising:
   a storage, storing a power consumption reference of each of a plurality of users, wherein each of the users corresponds to a site controller, and each of the users corresponds to an energy storage device;
   a communication interface, being configured to receive a first state of charge of each of the energy storage devices at a first time point from the corresponding site controller; and
   a processor, being electrically connected to the storage and the communication interface and configured to determine a scheduled power consumption target of each of a plurality of scheduling periods for each of the users according to a total support power, the power consumption references, and first stages of charge;
   wherein the communication interface transmits each of the scheduled power consumption targets corresponding to a first scheduling period of the scheduling periods to the corresponding site controller;
   wherein each of the site controllers controls the corresponding energy storage device to perform energy adjustment according to a corresponding first actual power consumption load and the corresponding first stage of charge during the first scheduling period so that a first power consumption of the corresponding user during the first scheduling period meets the corresponding scheduled power consumption target,
   wherein a second scheduling period of the scheduling periods is later than the first scheduling period, a second time point is later than the first time point, and the communication interface receives a second stage of charge of each of the energy storage devices at the second time point from the corresponding site controller,
   wherein the processor updates the scheduled power consumption target of each of the scheduling periods except the first scheduling period for each of the users according to the total support power, the power consumption references, and the second stages of charge, and the communication interface transmits each of the scheduled power consumption targets corresponding to the second scheduling period to the corresponding site controller,
   wherein each of the site controllers controls the corresponding energy storage device to perform energy adjustment according to a corresponding second actual power consumption load and the corresponding second stage of charge during the second scheduling period so that a second power consumption of the corresponding user during the second scheduling period meets the corresponding scheduled power consumption target.

2. The energy dispatch apparatus of claim 1, wherein for each of the users, the processor determines a first dispatch power of the user during each of the scheduling periods according to a load prediction curve of the user, a preset power consumption target of the user, and the first stage of charge of the user.

3. The energy dispatch apparatus of claim 2, wherein the users comprises a first user and a second user, the processor determines that the energy storage device of the first user has a first remaining power according to the first stage of charge of the energy storage device of the first user and the first dispatch powers of the first user, the processor computes a first insufficient power of the energy storage device of the second user during the first scheduling period according to the load prediction curve of the second user, the first dispatch power of the second user during the first scheduling period, and the preset power consumption target of the second user,
   wherein the processor determines the scheduled power consumption target of the first user during the first scheduling period and the scheduled power consumption target of the second user during the first scheduling period according to the preset power consumption target of the first user, the preset power consumption target of the second user, the first remaining power, and the first insufficient power.

4. The energy dispatch apparatus of claim 3, wherein the users comprise a third user, the processor determines that the energy storage device of the third user has a second remaining power according to the first stage of charge of the third user and the first dispatch powers of the third user,
   wherein the processor determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first remaining power, the second remaining power, and the first insufficient power.

5. The energy dispatch apparatus of claim 3, wherein the users comprise a third user, the processor computes a second insufficient power of the energy storage device of the third user during the first scheduling period according to the load prediction curve of the third user, the first dispatch power of the third user during the first scheduling period, and the preset power consumption target of the third user,
   wherein the processor determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first remaining power, the first insufficient power, and the second insufficient power.

6. The energy dispatch apparatus of claim 2, wherein the users comprise a first user and a second user, the processor determines that one of the first dispatch power of the first user during the first scheduling period and the first dispatch power of the second user during the first scheduling period is charging and another of the first dispatch power of the first user during the first scheduling period and the first dispatch power of the second user during the first scheduling period is discharging,
   wherein the processor determines the scheduled power consumption target of the first user during the first scheduling period and the scheduled power consumption target of the second user during the first scheduling period according to the preset power consumption target of the first user, the preset power consumption target of the second user, the first dispatch power of the first user during the first scheduling period, the first dispatch power of the second user during the first scheduling period, the first stage of charge of the first user, and the first stage of charge of the second user.

7. The energy dispatch apparatus of claim 2, wherein the users comprise a first user, a second user, and a third user, the processor determines that two of the first dispatch power of the first user during the first scheduling period, the first dispatch power of the second user during the first scheduling period, and the first dispatch power of the third user during the first scheduling period are charging and another of the first dispatch power of the first user during the first scheduling period, the first dispatch power of the second user during the first scheduling period, and the first dispatch power of the third user during the first scheduling period is discharging, wherein the processor determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first dispatch power of the first user during the first scheduling period, the first dispatch power of the second user during the first scheduling period, the first dispatch power of the third user during the first scheduling period, the first stage of charge of the first user, the first stage of charge of the second user, and the first stage of charge of the third user.

8. The energy dispatch apparatus of claim 2, wherein the users comprise a first user, a second user, and a third user, the processor determines that two of the first dispatch power of the first user during the first scheduling period, the first dispatch power of the second user during the first scheduling period, and the first dispatch power of the third user during the first scheduling period are discharging and another of the first dispatch power of the first user during the first scheduling period, the first dispatch power of the second user during the first scheduling period, and the first dispatch power of the third user during the first scheduling period is charging, wherein the processor determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first dispatch power of the first user during the first scheduling period, the first dispatch power of the second user during the first scheduling period, the first dispatch power of the third user during the first scheduling period, the first stage of charge of the first user, the first stage of charge of the second user, and the first stage of charge of the third user.

9. An energy dispatch system, comprising:
a plurality of site controllers, corresponding to a plurality of users one to one, wherein each of the users corresponds to an energy storage device; and
a server, being configured to store a power consumption reference of each of the users, receive a first state of charge of each of the energy storage devices at a first time point from the corresponding site controllers, determine a scheduled power consumption target of each of a plurality of scheduling periods for each of the users according to a total support power, the power consumption references, and first stages of charge, and transmit each of the scheduled power consumption targets corresponding to a first scheduling period of the scheduling periods to the corresponding site controller, wherein each of the site controllers receives the corresponding scheduled power consumption target and controls the corresponding energy storage device to perform energy adjustment according to a corresponding first actual power consumption load and the corresponding first stage of charge during the first scheduling period so that a first power consumption of the corresponding user during the first scheduling period meets the corresponding scheduled power consumption target, wherein a second scheduling period of the scheduling periods is later than the first scheduling period, a second time point is later than the first time point, and the server receives a second stage of charge of each of the energy storage devices at the second time point from the corresponding site controller, wherein the server updates the scheduled power consumption target of each of the scheduling periods except the first scheduling period for each of the users according to the total support power, the power consumption references, and the second stages of charge and transmits each of the scheduled power consumption targets corresponding to the second scheduling period to the corresponding site controller, wherein each of the site controllers receives the corresponding power consumption target, and each of the site controllers controls the corresponding energy storage device to perform energy adjustment according to a corresponding second actual power consumption load and the corresponding second stage of charge during the second scheduling period so that a second power consumption of the corresponding user during the second scheduling period meets the corresponding scheduled power consumption target.

10. The energy dispatch system of claim 9, wherein for each of the users, the server determines a first dispatch power of the user during each of the scheduling periods according to a load prediction curve of the user, a preset power consumption target of the user, and the first stage of charge of the user.

11. The energy dispatch system of claim 10, wherein the users comprise a first user and a second user, the server determines that the energy storage device of the first user has a first remaining power according to the first stage of charge of the energy storage device of the first user and the first dispatch powers of the first user, the server computes a first insufficient power of the energy storage device of the second user during the first scheduling period according to the load prediction curve of the second user, the first dispatch power of the second user during the first scheduling period, and the preset power consumption target of the second user, wherein the server determines the scheduled power consumption target of the first user during the first scheduling period and the scheduled power consumption target of the second user during the first scheduling period according to the preset power consumption target of the first user, the preset power consumption target of the second user, the first remaining power, and the first insufficient power.

12. The energy dispatch system of claim 11, wherein the users comprise a third user, and the server determines that the energy storage device of the third user has a second remaining power according to the first stage of charge of the third user and the first dispatch powers of the third user,
    wherein the server determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first remaining power, the second remaining power, and the first insufficient power.

13. The energy dispatch system of claim 11, wherein the users comprise a third user, the server computes a second insufficient power of the energy storage device of the third user during the first scheduling period according to the load prediction curve of the third user, the first dispatch power of the third user during the first scheduling period, and the preset power consumption target of the third user,
    wherein the server determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first remaining power, the first insufficient power, and the second insufficient power.

14. The energy dispatch system of claim 10, wherein the users comprises a first user and a second user, the server determines that one of the first dispatch power of the first user during the first scheduling period and the first dispatch power of the second user during the first scheduling period is charging and another of the first dispatch power of the first user during the first scheduling period and the first dispatch power of the second user during the first scheduling period is discharging,
    wherein the server determines the scheduled power consumption target of the first user during the first scheduling period and the scheduled power consumption target of the second user during the first scheduling period according to the preset power consumption target of the first user, the preset power consumption target of the second user, the first dispatch power of the first user during the first scheduling period, the first dispatch power of the second user during the first scheduling period, the first stage of charge of the first user, and the first stage of charge of the second user.

15. The energy dispatch system of claim 10, wherein the users comprise a first user, a second user, and a third user, the server determines that two of the first dispatch power of the first user during the first scheduling period, the first dispatch power of the second user during the first scheduling period, and the first dispatch power of the third user during the first scheduling period are charging and another of the first dispatch power of the first user during the first scheduling period, the first dispatch power of the second user during the first scheduling period, and the first dispatch power of the third user during the first scheduling period is discharging,
    wherein the server determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first dispatch power of the first user during the first scheduling period, the first dispatch power of the second user during the first scheduling period, the first dispatch power of the third user during the first scheduling period, the first stage of charge of the first user, the first stage of charge of the second user, and the first stage of charge of the third user.

16. The energy dispatch system of claim 10, wherein the users comprise a first user, a second user, and a third user, the server determines that two of the first dispatch power of the first user during the first scheduling period, the first dispatch power of the second user during the first scheduling period, and the first dispatch power of the third user during the first scheduling period are discharging and another of the first dispatch power of the first user during the first scheduling period, the first dispatch power of the second user during the first scheduling period, and the first dispatch power of the third user during the first scheduling period is charging,
    wherein the server determines the scheduled power consumption target of the first user during the first scheduling period, the scheduled power consumption target of the second user during the first scheduling period, and the scheduled power consumption target of the third user during the first scheduling period according to the preset power consumption target of the first user, the preset power consumption target of the second user, the preset power consumption target of the third user, the first dispatch power of the first user during the first scheduling period, the first dispatch power of the second user during the first scheduling period, the first dispatch power of the third user during the first scheduling period, the first stage of charge of the first user, the first stage of charge of the second user, and the first stage of charge of the third user.

17. The energy dispatch system of claim 9, wherein the server transmits each of the scheduled power consumption targets corresponding to the scheduling periods except the first scheduling period to the corresponding site controller.

18. An energy dispatch method for use in an energy dispatch system, the energy dispatch system comprising a server and a plurality of site controllers, the site controllers corresponding to a plurality of users one to one, each of the users corresponding to an energy storage device, the server storing a power consumption reference of each of the users, the energy dispatch method comprising:
    receiving, by the server, a stage of charge of each of the energy storage devices at a first time point from the corresponding site controller;
    determining, by the server, a scheduled power consumption target of each of a plurality of scheduling periods for each of the users according to a total support power, the power consumption references, and the stages of charge;
    transmitting, by the server, each of the scheduled power consumption targets corresponding to a first scheduling period of the scheduling periods to the corresponding site controller;
    receiving, by each of the site controllers, the corresponding scheduled power consumption target; and
    controlling, by each of the site controllers, the corresponding energy storage device to perform energy adjustment according to a corresponding actual power consumption load and the corresponding stage of charge during the scheduling period so that a power consumption of the corresponding user during the scheduling period meets the corresponding scheduled power consumption target, wherein a second scheduling period of the scheduling periods is later than the first scheduling period, a second time point is later than the first time point, and the server receives a second stage of charge of each of the energy storage devices at the second time point from the corresponding site controller, and the method further comprises:

updating, by the server, the scheduled power consumption target of each of the scheduling periods except the first scheduling period for each of the users according to the total support power, the power consumption references, and the second stages of charge;

transmitting, by the server, each of the scheduled power consumption targets corresponding to the second scheduling period to the corresponding site controller;

receiving, by each of the site controllers, the corresponding power consumption target; and controlling, by each of the site controllers, the corresponding energy storage device to perform energy adjustment according to a corresponding second actual power consumption load and the corresponding second stage of charge during the second scheduling period so that a second power consumption of the corresponding user during the second scheduling period meets the corresponding scheduled power consumption target.

* * * * *